US012803356B2

(12) United States Patent
Keitamo et al.

(10) Patent No.: US 12,803,356 B2
(45) Date of Patent: Nov. 17, 2026

(54) STATOR OF AN ELECTRIC MACHINE

(71) Applicant: ABB Schweiz AG, Baden (CH)

(72) Inventors: Jori Keitamo, Helsinki (FI); Aron Szucs, Helsinki (FI); Ari Vartiainen, Helsinki (FI); Juhani Mantere, Helsinki (FI); Klas Sandholm, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 600 days.

(21) Appl. No.: 18/260,347

(22) PCT Filed: Jan. 11, 2021

(86) PCT No.: PCT/EP2021/050377
§ 371 (c)(1),
(2) Date: Jul. 5, 2023

(87) PCT Pub. No.: WO2022/148551
PCT Pub. Date: Jul. 14, 2022

(65) Prior Publication Data

US 2024/0072592 A1 Feb. 29, 2024

(51) Int. Cl.
*H02K 3/28* (2006.01)
*H02K 21/22* (2006.01)
*H02K 29/03* (2006.01)

(52) U.S. Cl.
CPC ............... *H02K 3/28* (2013.01); *H02K 21/22* (2013.01); *H02K 29/03* (2013.01)

(58) Field of Classification Search
CPC .... H02K 1/165; H02K 29/03; H02K 2213/12; H02K 21/12; H02K 21/16
See application file for complete search history.

(56) References Cited

U.S. PATENT DOCUMENTS 10,886,811 B2 1/2021 Azar et al.
2011/0074243 A1* 3/2011 Liang .................... H02K 1/165 310/216.112

(Continued)

FOREIGN PATENT DOCUMENTS

CN 111245118 A * 6/2020 ............. H02K 1/165
DE 102008032314 A1 * 1/2010 ............... H02K 1/14

(Continued)

OTHER PUBLICATIONS

DE-102008032314-A1 Machine Translation (Year: 2010).*

(Continued)

*Primary Examiner* — Oluseye Iwarere
*Assistant Examiner* — Masoud Vaziri
(74) *Attorney, Agent, or Firm* — Greenberg Traurig, LLP

(57) ABSTRACT

An annular stator provided with axial stator slots and stator teeth formed between adjacent stator slots. Each stator slot receives a conductor of a stator winding. The stator is formed of stator sectors. Each stator sector includes two outermost stator teeth and intermediate stator teeth between the two outermost stator teeth. A width of the two outermost stator teeth is equal. Adjacent stator slots within each stator sector are distanced by a first slot pitch and adjacent stator slots belonging to different stator sectors are distanced by a second slot pitch. The first slot pitch is smaller than the second slot pitch.

13 Claims, 5 Drawing Sheets

(56) References Cited

U.S. PATENT DOCUMENTS

Figure 1:
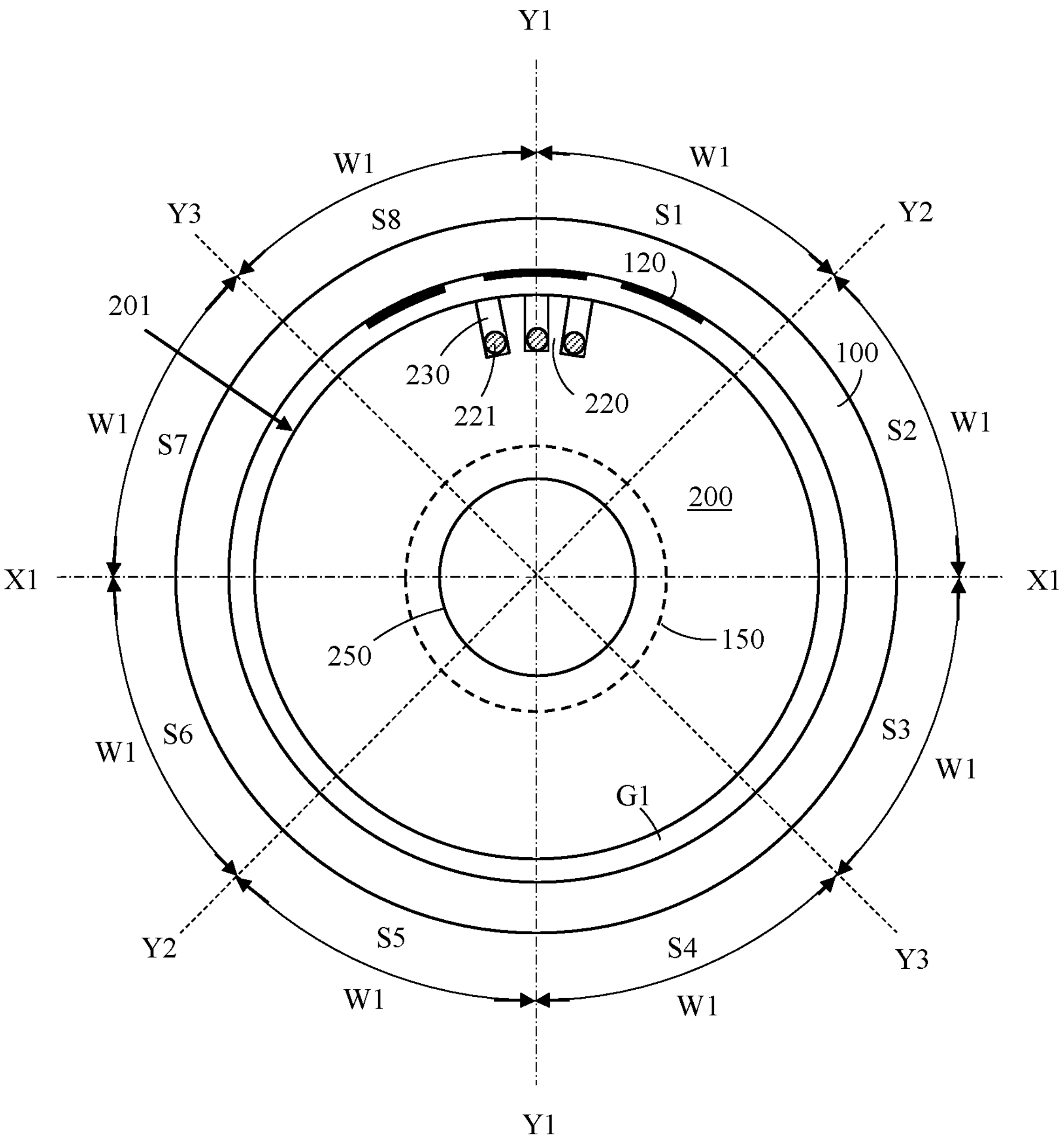

| | | | | |
|---|---|---|---|---|
| 2012/0074797 A1* | 3/2012 | Petter | H02K 21/16 | 29/598 |
| 2012/0299434 A1* | 11/2012 | Hartmann | H02K 1/148 | 310/216.074 |
| 2013/0088116 A1* | 4/2013 | Chin | H02K 1/22 | 310/216.112 |
| 2018/0152060 A1* | 5/2018 | Rasmussen | H02K 1/148 | |
| 2019/0393751 A1* | 12/2019 | Azar | H02K 3/28 | |
| 2022/0140684 A1* | 5/2022 | Boubaker | H02K 3/28 | 310/208 |
| 2024/0030759 A1* | 1/2024 | Dotz | H02K 1/165 | |
| 2024/0048006 A1* | 2/2024 | Dotz | H02K 1/165 | |

FOREIGN PATENT DOCUMENTS

| | | | | |
|---|---|---|---|---|
| EP | 2163526 A1 | 3/2010 | | |
| EP | 2662950 A1 * | 11/2013 | H02K 1/16 | |
| EP | 2922177 A1 | 9/2015 | | |
| GB | 1015117 A | 12/1965 | | |
| GB | 2582941 A | 10/2020 | | |

OTHER PUBLICATIONS

CN-111245118-A Machine Translation (Year: 2020).*
EP-2662950-A1 Machine Translation (Year: 2013).*
International Preliminary Report on Patentability; Application No. PCT/EP2021/050377; Completed: Apr. 4, 2023; Mailed: Apr. 5, 2023; 28 Pages.
Patent Cooperation Treaty International Search Report; Application No. PCT/EP2021/050377; Completed: Sep. 27, 2021; Mailed: Oct. 8, 2021; 5 Pages.

* cited by examiner

STATOR OF AN ELECTRIC MACHINE

TECHNICAL FIELD

The invention relates to a stator of an electric machine.

BACKGROUND

Electric machines i.e. electric motors and electric generators are used in many applications. Electric motors are used to drive different kinds of machines and electric generators are used to produce electric power.

An electric machine may comprise a rotor and a stator. The rotor may be positioned inside the stator or outside the stator. The rotor may be rotatable in relation to the stationary stator. The rotor may be provided with a rotor winding or with permanent magnets. The stator may comprise a stator core and a stator winding.

Electric machines may have a stator core made of sectors. The stator sectors may be positioned edge to edge forming a circular stator. Each stator sector may have an angular width in a circumferential direction of the rotor and a length in an axial direction of the stator. The sum of the angular widths of the stator sectors may be 360 degrees. The angular width of each stator sector may be equal. The axial length of each stator sector may also be equal. Each stator sector may comprise axially directed slots for the stator coils. A tooth may be formed between adjacent slots in the stator sector. Straight portions of the stator coils may be seated in the slots and the end portions of the stator coils may be protrude outwards from the axial ends of the stator sector. Each stator sector may be made of a pack of thin electromagnetic stator sheets. Thicker end plates are further provided at each axial end of the stator sector. The pack of stator sheets may be pressed together between the end plates in a press. Axial support beams may then be positioned on the radially inner surface of the stator sector. The axial support beams may be welded to the end plates. There may be an axial support beam at each angular edge of the stator sector. The winding may then be provided on the stator sector. The complete stator sector comprising the stator core and the stator winding may then be transported as one module to the site. Two adjacent stator sectors may be attached to each other with bolts extending between the support beams at the angular edges of the stator sectors.

The end portions of the stator windings may be bent so that they fit into the limited end spaces of the electric machine. The bending of the end portions may be done in different manners. One possibility is to use three different types of sector coils so that one sector coil has straight ends, a second sector coil has 45 degrees bent coil ends, and a third sector coil has 90 degrees bent coil ends.

Especially electric machines having rotors with permanent magnet poles suffer from torque ripple caused by a cyclic torque called cogging. Cogging results from the tendency of the rotor and the stator to align themselves in a position of minimum magnetic reluctance. This phenomenon exists even in an un-energized machine. Cogging occurs when the rotor poles are moving over the edges of the stator teeth. The magnitude of cogging is the sum of interaction between individual rotor poles and stator teeth, and it depends on the relationship between the number of rotor poles and stator teeth.

The cogging problem is conventionally addressed by adjusting the rotor poles. This may be done by skewing individual magnets in relation to one another in a circumferential direction in electric machines having rotor poles formed of axially extending rows of magnets. Another solution is to shape the permanent magnets so that they move smoother over a stator tooth edge. Still a further solution is to adjust the angular distances of adjacent rotor poles such that the distances become non-uniform. Corresponding adjusting measures can also be applied to the stator teeth, but the adjustment of the rotor poles is often a more preferred option.

The width of the outermost teeth at both circumferential ends of the stator sector in prior art stators made of stator sectors is normally only half of the width of the intermediate teeth in the stator sector. The mechanical strength of the outermost teeth at both circumferential ends of the stator sectors may thus cause problems. The manufacturing tolerances may also, especially in big electric machines, cause problems in the alignment of the fingers in the end plates of the stator with the teeth in the stack of stator plates. This problem relates especially to the two thinner outermost teeth in each stator sector.

SUMMARY

An object of the present invention is to achieve an improved stator of an electric machine.

The stator of the electric machine according to the invention is defined in claim 1.

The stator of the electric machine comprises

- an annular stator having a longitudinal centre axis, the stator comprising axial stator slots and stator teeth formed between adjacent stator slots, each stator slot receiving a conductor of a stator winding, the stator being formed of stator sectors, each stator sector comprising an outermost stator tooth at each angular outer edge of the stator sector and intermediate stator teeth between the two outermost stator teeth, a width of the two outermost stator teeth in each stator sector being equal, adjacent stator slots within each stator sector being distanced by a first slot pitch and adjacent stator slots belonging to different stator sectors being distanced by a second slot pitch.

The stator is characterized in that the first slot pitch is smaller than the second slot pitch.

The width of the two outermost stator teeth in each stator sector will thus be over 50% of the width of the intermediate stator teeth. The mechanical strength of the two outermost stator teeth will thus be increased compared to a prior art solution in which the width of the two outermost stator teeth is smaller.

The situation in which the outermost teeth have a greater width will make the assembling of the stator easier. It will be easier to fit the outermost fingers in the end plates in line with the outermost teeth in the stator plates in the stator sector. A possible manual bending of the outermost fingers in the end plates will be eliminated.

The increase in the width of the outermost teeth in each stator sector with a simultaneous decrease of the width of the intermediate teeth in the stator sector will also result in a quasi-skewing of the stator in relation to the rotor. The quasi-skewing will reduce the cogging torque of the electric machine. The main principle of quasi-skewing is to break the uniform periodicity of the magnetically admitted teeth of the stator in relation to the rotor. This may be done by shifting the center line of the stator teeth when the rotor is maintained unamended. This is equivalent to shifting the centerline of the stator slot.

The increase in the width of the outermost teeth in each stator sector may be applied in big electric machines where the stator is normally made of sectors. The stator in smaller electric machines is on the contrary normally made as one entity. The quasi skewing may be applied in big electric machines as well as in smaller electric machines.

The invention may advantageously be applied in an electric machine with a rotor provided with permanent magnets.

DRAWINGS

Figure 2:
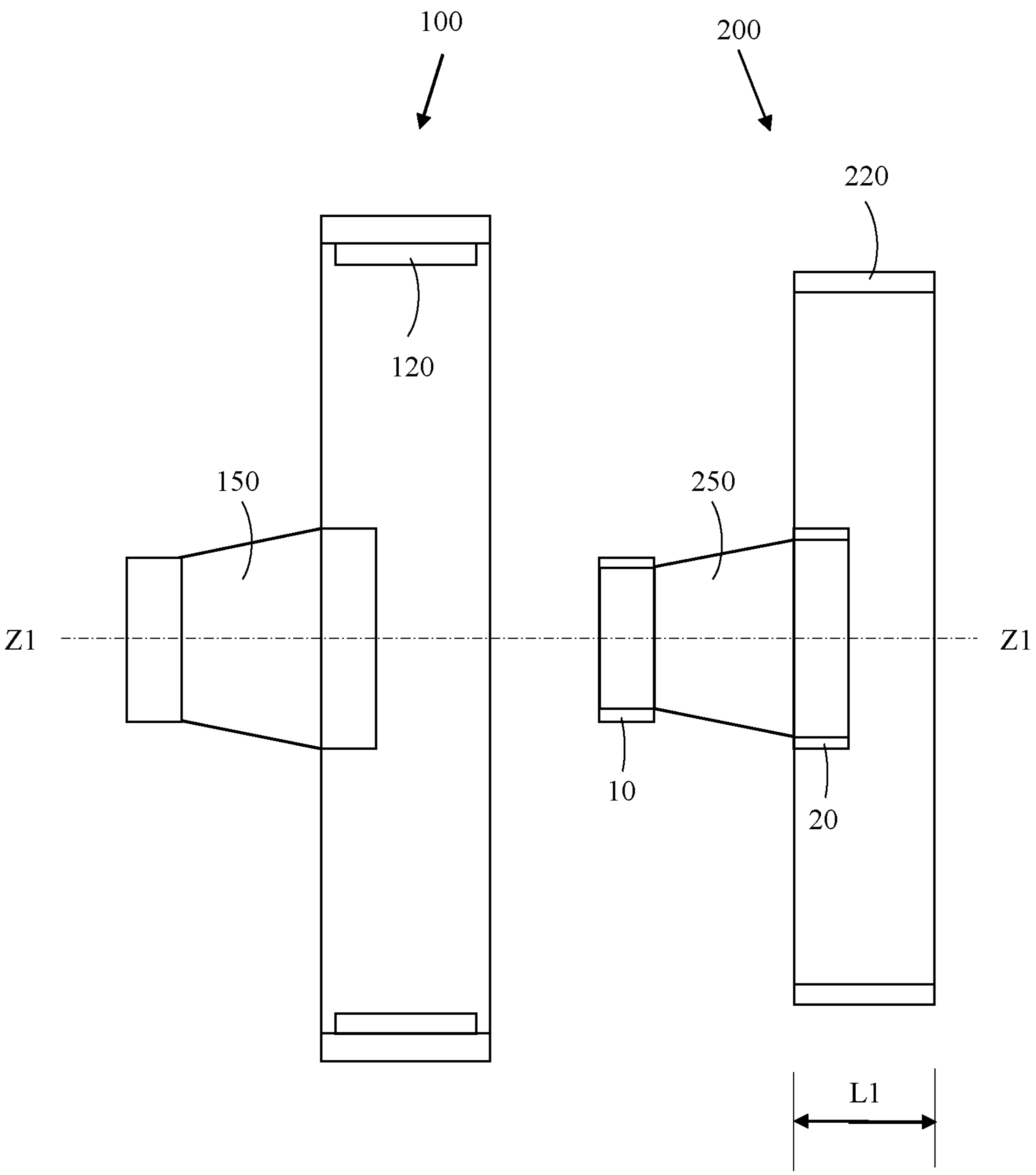
Figure 3:
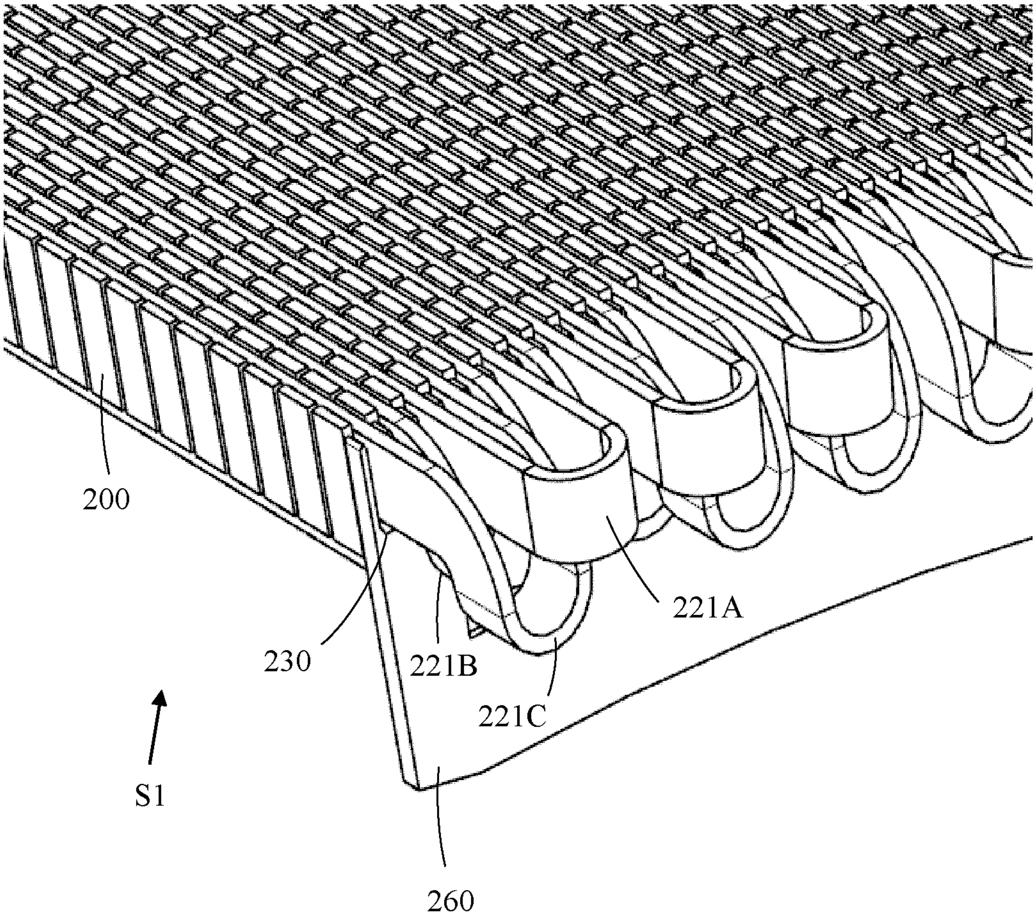
Figure 4:
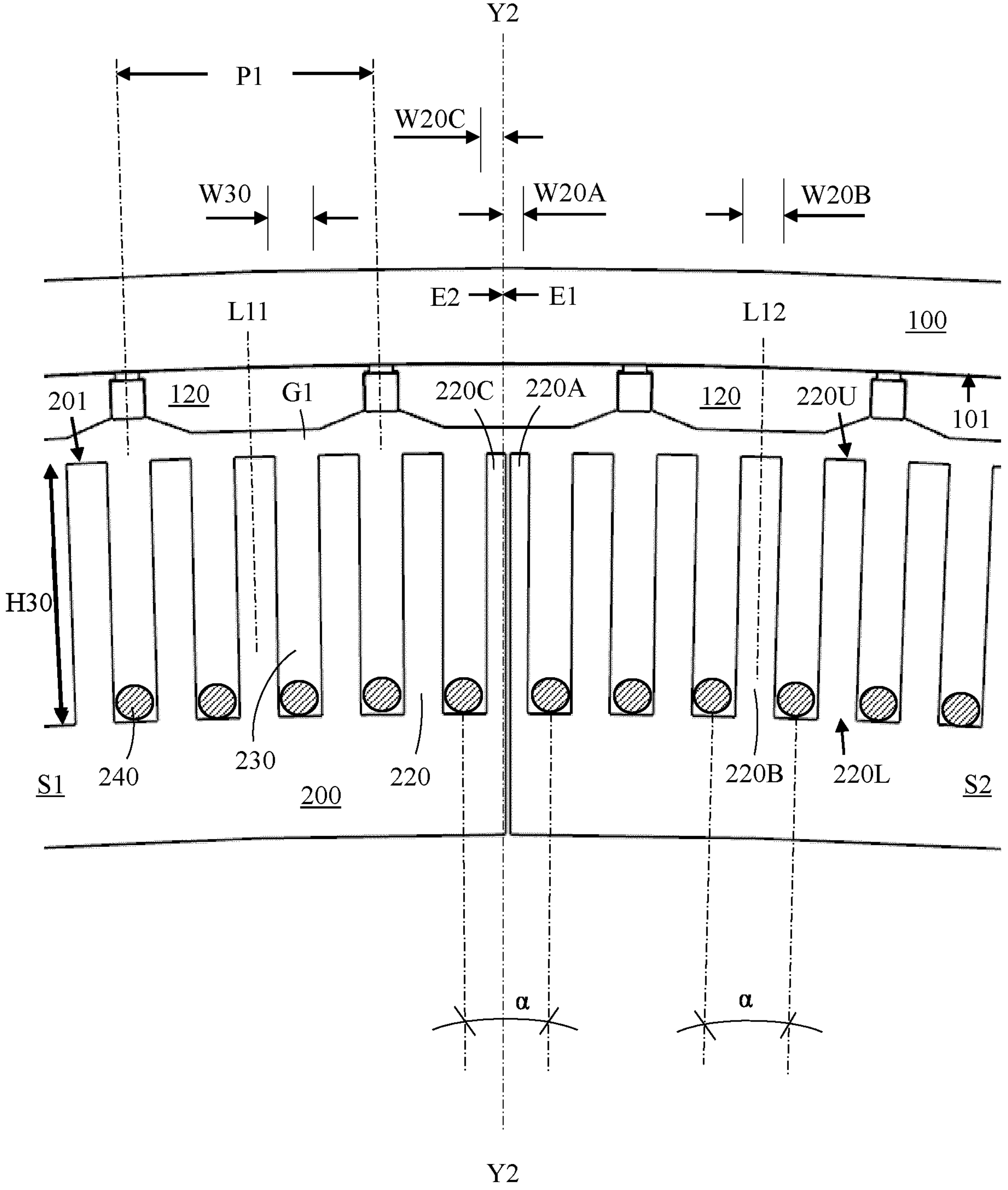
Fig. 4 (Prior art)
Figure 5:
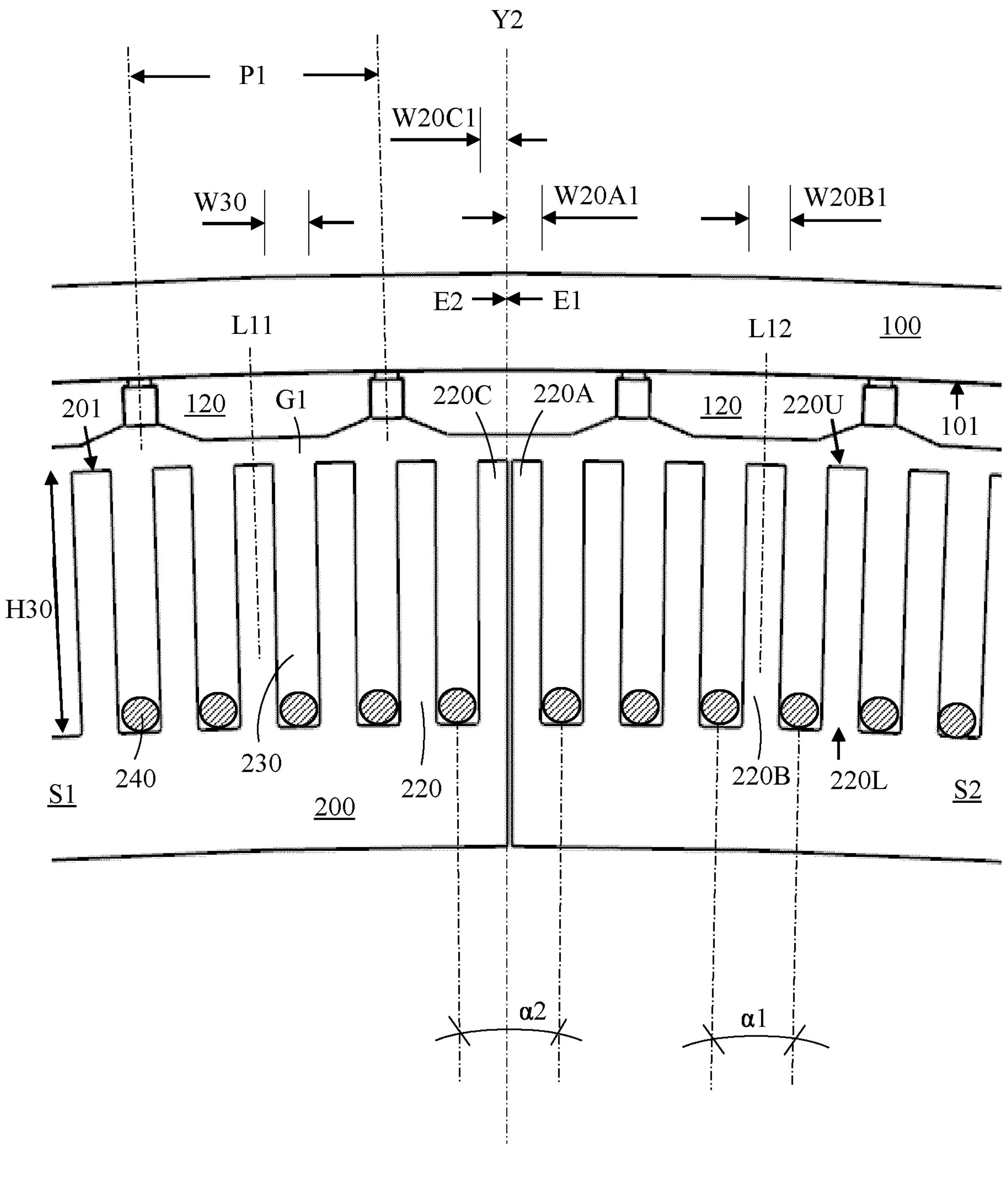

In the following the invention will be described in greater detail by means of preferred embodiments with reference to the attached drawings, in which FIG. 1 shows a transverse cross-section of an electric machine, FIG. 2 shows a longitudinal cross-section of the electric machine, FIG. 3 shows a portion of a stator sector of the electric machine, FIG. 4 shows a cross-section of a portion of two adjacent stator sectors and a rotor of a prior art electric machine, FIG. 5 shows a cross-section of a portion of two adjacent stator sectors and a rotor of an electric machine according to the invention.

DETAILED DESCRIPTION

FIG. 1 shows a transverse cross-section of an electric machine and FIG. 2 shows a longitudinal cross-section of the electric machine.

The electric machine 100 may comprise a longitudinal centre axis Z1-Z1, a rotor 100, and a stator 200. The rotor 100 may comprise a rotor shaft 150 and the stator 200 may comprise a stator shaft 250. The stator 200 may be positioned inside the rotor 100. The rotor 100 and the stator 200 may be cylindrical.

The stator 200 and thereby also the stator shaft 250 may be stationary. The rotor 100 and thereby also the rotor shaft 150 may be rotating. The rotor shaft 150 may be rotatably supported on the stator shaft 250. The rotatable support between the stator shaft 250 and the rotor shaft 150 may be realized with sliding bearings 10, 20. A sliding bearing 10, 20 may be positioned on each axial Z1-Z1 end of the stator shaft 250. The rotor shaft 150 and thereby also the rotor 100 may thus rotate on the stator shaft 250.

The stator 200 may be annular. The stator 200 may further have an axial length L1. The stator 200 may still further have an outer surface 201.

The rotor 100 may be provided with permanent magnets 120. The permanent magnets 120 may be positioned on the inner surface of the cylindrical rotor 100 or the permanent magnets 120 may be recessed into the rotor 100.

The stator 200 may comprise a stator core provided with axial stator slots 230. The axially extending stator slots 220 may protrude into the stator 200 from the outer surface 201 of the cylindrical stator 200. A stator winding 221 may be provided in the stator slots 230. The stator winding 221 may comprise straight portions extending in the stator slots 230 and end portions protruding outwards from the axial Z1-Z1 ends of the stator 200.

There is an air gap G1 between the outer surface 201 of the stator 200 and the inner surface of permanent magnets 120 of the rotor 100.

The stator 200 may be made of stator sectors S1-SN. The figure shows an embodiment in which the stator 200 is made of eight stator sectors S1-S8. The angular width W1 of each stator sector S1-S8 is thus 45 degrees. The number N of stator sectors S1-SN could be any even integer e.g. N=2, 4, 6, 8, 10, 12, 14 etc.

The electric machine comprises further a horizontal centre plane X1-X1 and a vertical centre plane Y1-Y1. The horizontal centre plane X1-X1 and the horizontal centre plane Y1-Y1 pass through the longitudinal centre axis Z1-Z1 of the electric machine. The longitudinal centre axis Z1-Z1, the horizontal centre plane X1-X1 and the vertical centre plane Y1-Y1 are common for the rotor 100 and the stator 200.

FIG. 3 shows a portion of a stator sector of the electric machine. The figure shows a portion of a sector S1 of the stator 200 of the electric machine with the stator windings. The end portions 221A, 221B, 221C of the three stator windings protrude out from the axial ends of the stator sector S1. The straight portions of the stator windings run in the axial slots 230 in the stator sector S1.

The stator winding may be formed of a stack of coil loops. The stack of coil loops may form a sector coil in the stator sector. The stack of coil loops may be produced from a conductor forming a closed loop with two end portions extending beyond the axial ends of the stator of the electric machine. The end portions may be connected through end connection rings to other closed loops of conductors.

The stator sector S1 may be formed of a stack of stator sheets and an end plate 260 at each axial Z1-Z1 end of the stack of stator sheets. The stator sheets may be electrical sheets. The end plates may be made of iron or steel. The stack of stator sheets is pressed between the end plates 260.

The end plates 260 may be provided with fingers corresponding to the teeth in the stator plates. The winding 221 pass through the slots between the fingers in the end plates 260.

FIG. 4 shows a cross-section of a portion of two adjacent stator sectors and the rotor of a prior art electric machine.

The figure shows a portion of a first stator sector S1 and a portion of a second stator sector S2 as well as the rotor 100. The first stator sector S1 and the second stator sector S2 are positioned adjacent to each other. The opposite angular outer edges E1, E2 of the two stator sectors S1, S2 are pressed together when the two stator sectors S1, S2 are connected to each other. The figure shows a radial centre line Y2-Y2 extending between the angular outer edges E1, E2 of the two stator sectors S1, S2.

The rotor 100 and the stator 200 of the electric machine may be cylindric. The rotor 100 may be positioned radially outside the stator 200. Another possibility would be to position the rotor 100 radially inside the stator 200.

The rotor 100 may comprise permanent magnets 120 positioned on a radially inner surface 101 of the rotor 100. The angular width P1 of the permanent magnets 120 is indicated in the figure.

There is an air gap G1 between the radial outer surface of the permanent magnets 120 and the radial outer surface 201 of the stator 200.

The stator 200 may be provided with axial Z1-Z1 stator slots 230 and axial Z1-Z1 stator teeth 220 formed between the stator slots 230. The stator slots 230 may extend from an outer surface 201 of the stator 200 radially inwards into the stator 200. The stator slots 230 may extend over the axial Z1-Z1 length L1 of the stator 200. A cross-section of the stator slots 230 may be substantially rectangular. Each stator slot 230 may receive a conductor 240 of the stator winding 221. The conductors 240 in each stator slot 230 may be formed of a stack of conductors with a substantially rectangular cross-section. The stack of conductors may fill the stator slots 230. The conductors 240 are only schematically presented with a circle in the figure.

The stator slots 230 may have a width W30. The width W30 of the stator slots 230 may be uniform throughout the radial height H30 of the stator slots 230. The radial height H30 of the stator slots 230 may be the same as the radial height of the stator teeth 220. A uniform width W30 of the stator slots 230 is advantageous especially in big electric machines where the coil forming the stator winding may have a rectangular cross-section.

The width W20B of the stator teeth 220 may on the other hand be non-uniform throughout the radial height H30 of the stator teeth 220. The width W20B of the stator teeth 220 at the radially outermost top 220U of the stator teeth 220 may be slightly greater compared to the width W20B of the stator teeth 220 at the radially innermost bottom 220L of the stator teeth 220. The height H30 of the stator teeth 220 and the height of the stator slots 230 may be equal. A cross-section of the stator teeth 220 may be substantially trapezoidal.

Each stator sector S1, S2 may comprise an outermost stator tooth 220A, 220C at each angular outer edge of the stator sector S1, S2 and intermediate stator teeth 220B between the two outermost stator teeth 220A, 220C.

A width W20A1, W20C1 of the two outermost stator teeth 220A, 220C in each stator sector S1, S2 may be equal.

Adjacent stator slots 230 within each stator sector S1, S2 may be distanced by a slot pitch α and adjacent stator slots 230 belonging to different stator sectors S1, S2 may be distanced by the same slot pitch α. The slot pitch is the angular distance between two adjacent stator slots.

The slot pitch α between adjacent stator slots 230 within each stator sector S1, S2 and the slot pitch α between adjacent stator slots belonging to different stator sectors S1, S2 is thus equal in the prior art solution of FIG. 4. The slot pitch α is thus uniform throughout the circumference of the stator 200. The slot pitch α is defined by the angle between two radiuses passing from a centre of the circular stator 200 to an angular centre of the respective stator slot 230. The centre of the circular stator 200 is outside the paper of the figure.

The width W20A, W20C of the two outermost teeth 220A, 220C in each stator sector S1, S2 is different compared to the width W20B of the intermediate stator teeth 220B in the stator sector S1, S2. The width W20B of all the intermediate stator teeth 220B in each stator sector S1, S2 may be equal. The width W20A, W20C of the two outermost teeth 220A, 220C in the stator sector S1, S2 may be half of the width W20B of the intermediate stator teeth 220B in the stator sector S1, S2.

This means that the width W20A+W20C of the combined tooth formed by the first stator tooth 220A at the beginning of the second stator sector S2 and the last stator tooth 220C at the end of the first stator sector S1 may be the same as the width W20B of the intermediate stator teeth 220B in the stator sector S1, S2. The width W20B of the teeth 220 in the prior art stator 200 is thus equal throughout the whole circumference of the stator 200.

A radial centre line L11 of a middlemost tooth 220 in a pole of the stator 200 in the first section S1 and a radial centre line L12 of a middlemost tooth 220 in a pole of the stator 200 in the second section S2 is also indicated in the figure. Each radial centre line L11, L12 of the middlemost tooth 220 of the stator 200 passes through the angular middle line of the respective permanent magnet 120 of the rotor 100. There is thus no skew between the stator 200 and the rotor 100 in this electric machine.

FIG. 5 shows a cross-section of a portion of two adjacent stator sectors and a rotor of an electric machine according to the invention.

The figure shows a portion of a first stator sector S1 and a portion of a second stator sector S2 as well as the rotor 100. The first stator sector S1 and the second stator sector S2 are positioned adjacent to each other. The opposite angular outer edges E1, E2 of the two stator sectors S1, S2 are pressed together when the two stator sectors S1, S2 are connected to each other. The figure shows a radial centre line Y2-Y2 extending between the angular outer edges E1, E2 of the two stator sectors S1, S2.

The rotor 100 and the stator 200 of the electric machine may be cylindric. The rotor 100 may be positioned radially outside the stator 200. Another possibility would be to position the rotor 100 radially inside the stator 200. The rotor 100 may be identical to the rotor 100 in the prior art electric machine shown in FIG. 4.

The rotor 100 may comprise permanent magnets 120 positioned on a radially inner surface 101 of the rotor 100. The angular width P1 of the permanent magnets 120 is indicated in the figure.

There is an air gap G1 between the radial outer surface of the permanent magnets 120 and the radial outer surface 201 of the stator 200.

The stator 200 may be provided with axial Z1-Z1 stator slots 230 and axial Z1-Z1 stator teeth 220 formed between the stator slots 230. The stator slots 230 may extend from an outer surface 201 of the stator 200 radially inwards into the stator 200. The stator slots 230 may extend over the axial Z1-Z1 length L1 of the stator 200. A cross-section of the stator slots 230 may be substantially rectangular. Each stator slot 230 may receive a conductor 240 of the stator winding 221. The conductors 240 in each stator slot 230 may be formed of a stack of conductors with a substantially rectangular cross-section. The stack of conductors may fill the stator slots 230. The conductors 240 are only schematically presented with a circle in the figure.

The stator slots 230 may have a width W30. The width W30 of the stator slots 230 may be uniform throughout the radial height H30 of the stator slots 230. The radial height H30 of the stator slots 230 may be the same as the radial height of the stator teeth 220. A uniform width W30 of the stator slots 230 is advantageous especially in big electric machines where the coil forming the stator winding may have a rectangular cross-section.

The width W20B of the stator teeth 220 may on the other hand be non-uniform throughout the radial height H30 of the stator teeth 220. The width W20B of the stator teeth 220 at the radially outermost top 220U of the stator teeth 220 may be slightly greater compared to the width W20B of the stator teeth 220 at the radially innermost bottom 220L of the stator teeth 220. The height H30 of the stator teeth 220 and the height of the stator slots 230 may be equal. A cross-section of the stator teeth 220 may be substantially trapezoidal.

Each stator sector S1, S2 may comprise an outermost stator tooth 220A, 220C at each angular outer edge of the stator sector S1, S2 and intermediate stator teeth 220B between the two outermost stator teeth 220A, 220C.

The width W30 and the height H30 of the stator slots 230 in this novel stator 200 may be identical with the width W30 and the height H30 of the stator slots 230 in prior art stator 200 shown in FIG. 4. The stator winding 240 used in the prior art stator shown in FIG. 4 may thus also be used in the novel stator 200.

The width W20A1 of the first tooth 220A in each stator sector S1, S2 and the width W20C1 of the last tooth 220C in each stator sector S1, S2 have been increased in FIG. 5 compared to the situation in FIG. 4. The width W220B1 of the intermediate teeth 220B in each stator sector S1, S2 have been reduced in a corresponding way so that the width W30 of the stator slots 230 remain the same as in FIG. 4. The width W220B1 of all the intermediate stator teeth 220B may be the same. It is advantageous e.g. from a manufacturing perspective to keep the width W220B1 of all the intermediate stator teeth 220B the same.

The width W20A1 of the first tooth 220A in each stator sector S1, S2 and the width W20C1 of the last tooth 220C in each stator sector S1, S2 is equal.

The sum of the width W20A1 of the first tooth 220A in each stator sector S1, S2 and the width W20C1 of the last tooth 220C in each stator sector S1, S2 is greater than the width W20B1 of each of the intermediate stator teeth 220B in the stator sector S1, S2.

This means that the sum of the width W20A1, W20C1 of the two outermost teeth 220A, 220C in each stator sector S1, SN is greater than the width W20B1 of each of the intermediate stator teeth 220B in the stator sector S1, SN.

The width of the teeth 220 in the inventive stator 200 is thus non-uniform along the circumference of the stator 200. Each intersection between two adjacent stator sectors S1, S2 comprises a wider stator tooth 220.

The width W20A1, W20C1 of each of the two outermost stator teeth 220A, 220C in each stator sector S1, S2 may be over 50% of the width W20B of the intermediate stator teeth 220B.

The width W20A1, W20C1 of each of the two outermost stator teeth 220A, 220C in each stator sector S1, S2 may on the other hand be at least 75% of the width W20B of the intermediate stator teeth 220B.

The width W20A1, W20C1 of each of the two outermost stator teeth 220A, 220C in each stator sector S1, S2 may be smaller than or equal to or greater than the width W20B of the intermediate stator teeth 220B.

A width W30 of the stator slots 230 may be greater than or equal to or smaller than the width W20B of the intermediate stator teeth 220B in each stator sector S1, S2.

Adjacent stator slots 230 within each stator sector S1, S2 may be distanced by a first slot pitch α1 and adjacent stator slots 230 belonging to different stator sectors S1, S2 may be distanced by a second slot pitch α2.

The first slot pitch α1 may be smaller than the second slot pitch α2 in the solution according to the invention shown in FIG. 5.

The first slot pitch α1 and the second slot pitch α2 may be defined by an angle between two radiuses passing from a centre of the circular stator 200 to an angular centre of the respective stator slot 230. The centre of the circular stator 200 is outside the paper of the figure.

The rotor 100 in the inventive electric machine shown in FIG. 5 may be identical with the rotor 100 in the prior art electric machine shown in FIG. 4.

The increase of the width W20A1, W20C1 of the two outermost teeth 220A, 220C in each stator sector S1, S2 results in an increased mechanical strength of the outermost teeth 220A, 220C in each stator sector S1, S2. The increased width W20A1, W20C1 is advantageous when the end plates 260 are to be attached to each axial end of the package of stator sheets. It may be difficult to produce end plates 260 fitting exactly to the stator sheets in an electric machine having a stator 200 with a great diameter. The outermost fingers in the end plates 260 might not be exactly in line with the outermost teeth 220A, 220C in the stator sectors S1, S2. The small width W20A, W20C of the outermost teeth 220A, 220C in prior art stators 200 will further increase the problem. The increased width W20A1, W20C1 of the two outermost teeth 220A, 220C will solve or at least diminish this problem.

The asymmetry of the teeth 220 in the stator 200 will also lead to a quasi-skewing of the stator 200 in relation to the rotor 100. The asymmetry of the teeth 220 is a result of the thicker tooth in the intersection between each stator sector S1, S2. The asymmetry of the teeth 220 will help in reducing the torque cogging of the electric machine.

A radial centre line L11 of a middlemost tooth 220 of a pole in the stator 200 in the first section S1 and a radial centre line L12 of a middlemost tooth 220 of a pole in the stator 200 in the second section S2 is also indicated in the figure. The radial centre line L11 of the middlemost tooth 220 of the pole of the stator 200 in the first sector S1 is shifted in an anti-clockwise direction from the angular middle line of the corresponding permanent magnet 120 of the rotor 100. The radial centre line L12 of the middlemost tooth 220 of the pole of the stator 200 in the second sector S2 is shifted in a clockwise direction from the angular middle line of the corresponding permanent magnet 120 of the rotor 100. A quasi-skewing is thus achieved in the electric machine.

The conductors 240 may be secured into the stator slots 230 with axial wedge parts at the outer portion of the stator 200. There may be recesses in the outer side edges of the stator slots 230 receiving the wedge parts. The wedges keep the conductors 240 in place in the stator slots 230. Magnetic forces and vibration are acting on the conductors 240. The wedges could be of a non-magnetic or of a paramagnetic material.

The width of the stator teeth 220 may be an average width of the stator teeth 220 in case the width of the stator teeth varies along the radial height H30 of the stator teeth 220. The width of a stator teeth 220 having the form of a trapeze could be measured at the middle of the radial height H30 of the stator teeth 220.

The number of slots and the number of teeth may be the same in the prior art electric machine shown in FIG. 4 and in the inventive electric machine shown in FIG. 5.

The increase of the outermost teeth in each stator sector may be applied in an electric machine having a stator with a great diameter i.e. the stator is made of sectors. The diameter of the stator of the electric machine may be in the order of 8 m. The stator may be made of 14 stator sectors. The angular width of each stator sector would then be 360/14=25.71 degrees. The stator may comprise 3*252=756 slots. There may thus be 54 slots per sector. The first slot pitch α1 within each stator sector may be 0.47 degrees. The second slot pitch α2 between adjacent stator sectors may be 0.62 degrees. The stator sheets may be electrical sheets having a thickness of substantially 0.5 mm. The end plates may be made of iron or steel and may have a thickness of substantially 3 mm. These dimensions are only mentioned as an example of an electric machine according to the invention. The invention may naturally be applied in electric machines having different dimensions fulfilling the requirements of the claims.

The invention is in the figures applied to an electric machine comprising an inner stator and an outer rotor. The invention is, however, not in any way limited to such an electric machine. The invention may as well be applied to an electric machine comprising an inner rotor and an outer stator. The electric machine may be an electric motor or an electric generator.

It will be obvious to a person skilled in the art that, as the technology advances, the inventive concept can be implemented in various ways. The invention and its embodiments are not limited to the examples described above but may vary within the scope of the claims.

The invention claimed is:

1. A stator of an electric machine comprising:

an annular stator having a longitudinal center axis, the stator including axial stator slots and stator teeth formed between adjacent stator slots, each stator slot receiving a conductor of a stator winding, the stator being formed of stator sectors, each stator sector including two outermost teeth, each outermost stator tooth at each angular outer edge of the stator sector and intermediate stator teeth between the two outermost stator teeth, a width of the two outermost stator teeth in each stator sector being equal, adjacent stator slots within each stator sector being distanced by a first slot pitch and adjacent stator slots belonging to different stator sectors being distanced by a second slot pitch, wherein the first slot pitch is smaller than the second slot pitch, wherein the second slot pitch is defined between adjacent stator slots located on opposite sides of an interface between two adjacent stator sectors, and wherein the slot pitches are defined by angular distances between radii from the stator center to centerlines of the respective stator slots, each stator slot having a substantially uniform slot width through a radial height of the stator slot, and each stator tooth having a substantially trapezoidal cross-section.

2. The stator as claimed in claim 1, wherein the width of each of the two outermost stator teeth in each stator sector is over 50% of the width of the intermediate stator teeth.

3. The stator as claimed in claim 1, wherein the width of each of the two outermost stator teeth in each stator sector is at least 75% of the width of the intermediate stator teeth.

4. The stator as claimed in claim 1, wherein the width of each of the two outermost stator teeth in each stator sector is smaller than the width of the intermediate stator teeth.

5. The stator as claimed in claim 1, wherein the width of each of the two outermost stator teeth in each stator sector is equal to the width of the intermediate stator teeth.

6. The stator as claimed in claim 1, wherein the width of each of the two outermost stator teeth in each stator sector is greater than the width of the intermediate stator teeth.

7. An electric machine comprising:

an annular stator having a longitudinal center axis, the stator including axial stator slots and stator teeth formed between adjacent stator slots, each stator slot receiving a conductor of a stator winding, the stator being formed of stator sectors, each stator sector including two outermost teeth, each outermost stator tooth at each angular outer edge of the stator sector and intermediate stator teeth between the two outermost stator teeth, a width of the two outermost stator teeth in each stator sector being equal, adjacent stator slots within each stator sector being distanced by a first slot pitch and adjacent stator slots belonging to different stator sectors being distanced by a second slot pitch, and a rotor, wherein the first slot pitch is smaller than the second slot pitch, wherein the second slot pitch is defined between adjacent stator slots located on opposite sides of an interface between two adjacent stator sectors, and wherein the slot pitches are defined by angular distances between radii from the stator center to centerlines of the respective stator slots, each stator slot having a substantially uniform slot width through a radial height of the stator slot, and each stator tooth having a substantially trapezoidal cross-section.

8. The electric machine as claimed in claim 7, wherein the stator of the electric machine is quasi-skewed in relation to the rotor of the electric machine due to asymmetry of the stator teeth in the electric machine.

9. The electric machine as claimed in claim 7, wherein the rotor is provided with permanent magnets.

10. The electric machine as claimed in claim 7, wherein the width of each of the two outermost stator teeth in each stator sector is at least 75% of the width of the intermediate stator teeth.

11. The electric machine as claimed in claim 7, wherein the width of each of the two outermost stator teeth in each stator sector is smaller than the width of the intermediate stator teeth.

12. The electric machine as claimed in claim 7, wherein the width of each of the two outermost stator teeth in each stator sector is equal to the width of the intermediate stator teeth.

13. The electric machine as claimed in claim 7, wherein the width of each of the two outermost stator teeth in each stator sector is greater than the width of the intermediate stator teeth.

* * * * *